April 26, 1960  V. W. FARRIS ET AL  2,934,305
COUPLING DEVICE
Filed May 29, 1957  4 Sheets-Sheet 2

INVENTORS
VICTOR W. FARRIS
CHARLES G. WEBER
BY
Bernard H. Kremlein
ATTORNEY

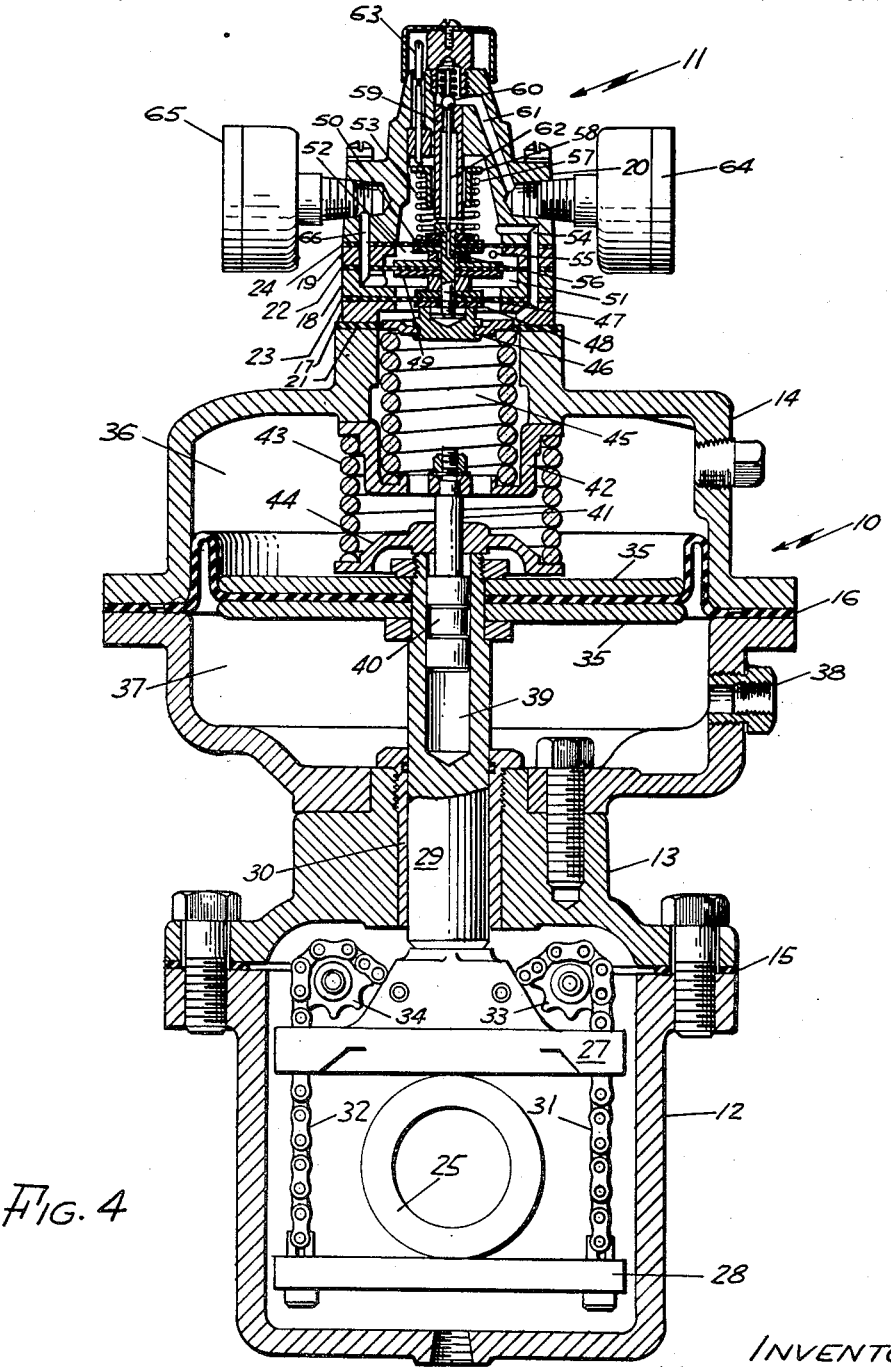

United States Patent Office 2,934,305
Patented Apr. 26, 1960

2,934,305

COUPLING DEVICE

Victor Wallace Farris, Tenafly, and Charles G. Weber, Packanack Lake, N.J., assignors to Farris Flexible Valve Corp., Palisades Park, N.J., a corporation of New Jersey Application May 29, 1957, Serial No. 662,407

7 Claims. (Cl. 251—5)

This invention relates to coupling devices and more particularly to a device for coupling the orifice-controlling mechanism of a valve to the diaphragm assembly of a valve positioner.

A valve positioner is a device, supplementary to a valve, designed to hold the orifice-controlling mechanism of the valve at a preselected setting within a preselected range, known as the throttling range, of the total valve capacity. The valve positioner operates to perform this function under the control of an externally generated signal, for example, a pneumatic signal, which, in turn, is responsive to an event resulting, for example, from a deviation of the valve capacity from the desired capacity originally selected.

Certain types of valves, among them, pinch valves, have orifice-controlling mechanisms the total stroke of which, corresponding to full capacity, is considerably greater than the stroke of the relatively limited capacity range within which it is generally desirable to exercise throttling control. The diaphragm assemblies of the valve positioners generally have a total stroke corresponding to the stroke of the valve orifice-controlling mechanism over the limited capacity range referred to. Therefore, unless the coupling between the positioner diaphragm assembly and the valve orifice-controlling mechanism includes a complex exteriorly located linkage system capable of absorbing the difference between the throttling range stroke and the full capacity stroke of the valve orifice-controlling mechanism, there is danger of damage to the valve positioner whenever, for any reason, the orifice-controlling mechanism moves to an extent outside the limited throttling range.

Most of the capacity of a pinch valve may be passed with a stroke corresponding only to about forty percent of the total stroke corresponding to full capacity and while not limited thereto, the present invention will be described in association with a pinch valve.

It is the main object of the present invention to eliminate the above-mentioned difficulties by providing a coupling for interconnecting the diaphragm assembly of a valve positioner and the orifice-controlling mechanism of a valve, which is so constructed that said diaphragm assembly is protected against damage by movement of said orifice-controlling mechanism outside the throttling range capacity of the valve.

It is a further object of the present invention to accomplish the foregoing in a simple manner and without the necessity of complex, exteriorly located linkage systems.

These and other objects, which will become more apparent as the detailed description of the present invention proceeds, are attained in the following manner.

The diaphragm assembly of the valve positioner and the orifice-controlling mechanism of the valve are interconnected by first and second, series-connected loading means, said second loading means exerting a pre-load force in excess of the maximum load force exerted by said first loading means. Said first loading means is coupled to the positioner diaphragm assembly and said second loading means is coupled to the valve orifice-controlling mechanism. As a result of the physical connections described and the force conditions above referred to, only the first loading means effectively connects the above-mentioned diaphragm assembly and valve orifice-controlling mechanism at valve capacities less than a preselected capacity. Means are provided whereby at valve capacities in excess of said preselected capacity, the first loading means is rendered inoperative, whereby the diaphragm assembly of the positioner becomes disconnected from the orifice-controlling mechanism of the valve. Additional means are provided, operative at valve capacities in excess of the preselected capacity, to permit only the second loading means to load the valve orifice-controlling mechanism. As a result, excessive stroke of the orifice-controlling mechanism is not transmitted to the positioner diaphragm assembly and the latter is thereby protected from the damage referred to in earlier portions of this specification.

In the accompanying specification there shall be described, and in the accompanying drawings shown, an illustrative embodiment of the present invention. It is, however, to be clearly understood that the present invention is not to be limited to the details herein shown and described for purposes of illustration only inasmuch as changes may be made therein without the exercise of invention and within the spirit and scope of the claims hereto appended.

In said drawings:

Fig. 4 is a longitudinal sectional view showing the valve substantially in its full capacity condition.

Figure 1:
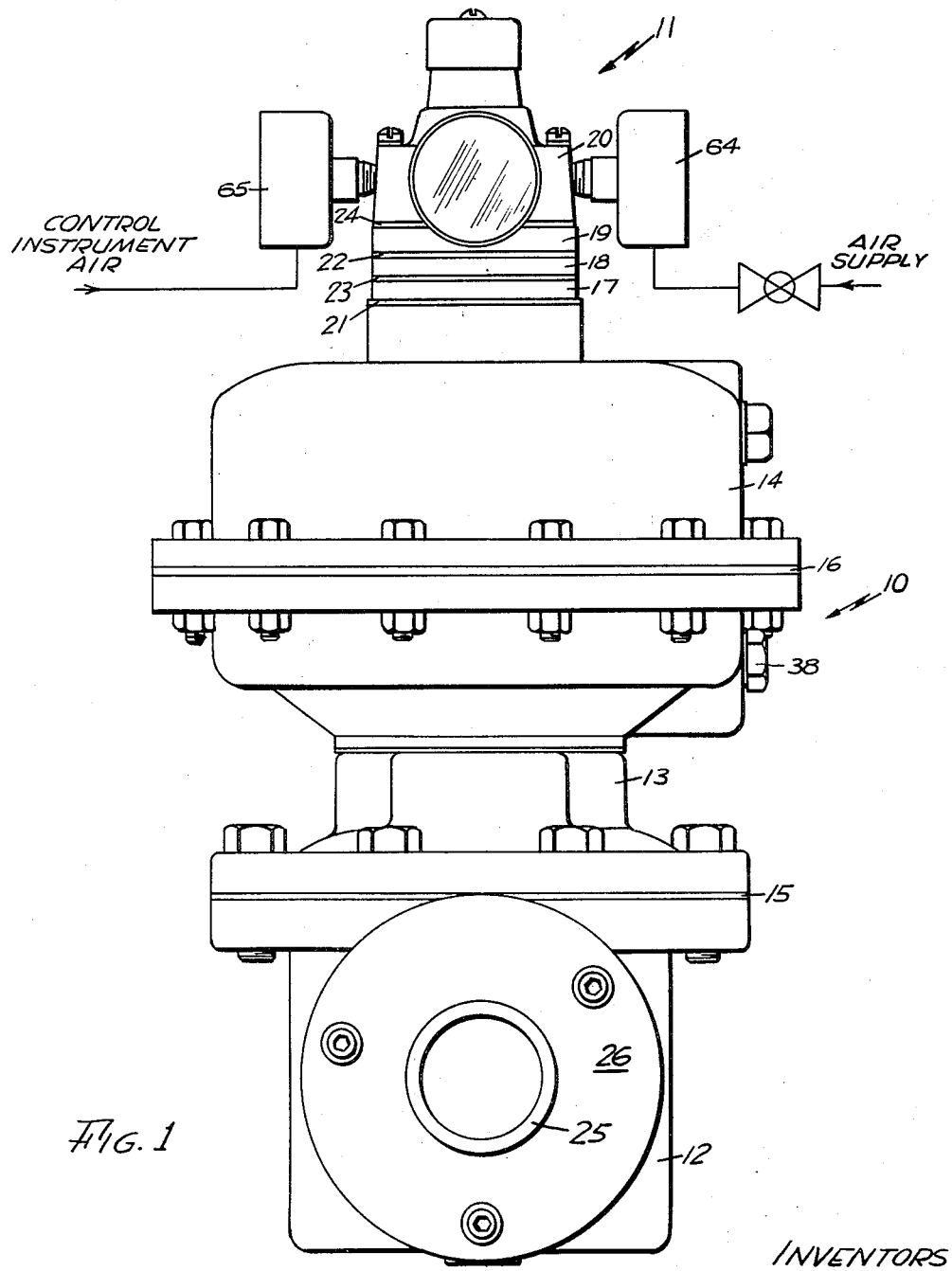
Fig. 1 is a side elevational view of a pinch valve provided with a valve positioner.

Referring now more in detail to the aforesaid illustrative embodiment of the present invention, and having reference to the aforesaid drawings, the numeral 10 generally designates a pinch valve for controlling the flow of fluid through a pipe line, and the numeral 11 generally designates a valve positioner for throttling said pinch valve. As will hereinafter be described in detail, the arrangement is such that the positioner maintains the capacity of the valve constant at a preselected capacity within a preselected capacity range, the positioner operating to perform this function in response to an externally generated signal initiated by any tendency of the valve to deviate from said preselected capacity.

The valve 10 includes lower, intermediate and upper housings 12, 13 and 14 bolted together as shown, with a sealing gasket 15 between the lower and intermediate housings and a sealing diaphragm 16 between the intermediate and upper housings. The positioner 11 includes a lower housing 17, two intermediate housings 18 and 19 and an upper housing 20. The lower housing 17 is mounted on the upper housing 14 of the valve, with a sealing gasket 21 therebetween. The intermediate housings 18 and 19 abut each other, with a sealing diaphragm 22 therebetween. Said intermediate housings also abut, respectively, the lower and upper housings 17 and 20 of the positioner and are separated therefrom by sealing diaphragms 23 and 24. The diaphragms 22, 23 and 24, together with the hereinafter described parts associated therewith, constitute the diaphragm assembly of the valve positioner.

Passing through the housing 12 of the valve 10 is a flexible conduit 25, said conduit being provided with flanges 26 (only one is shown) at its ends for securing the same to the adjacent ends of a pipe line (not shown) the flow of fluid through which it is desired to control. Contacting the conduit 25 at diametrically opposed points within the housing 12 are upper and lower jaw members 27 and 28, said jaw members, together with the hereinafter described means for moving the same toward and away from each other, constituting the orifice-controlling mechanism of the valve. The upper jaw member is secured to the lower end of a plunger 29 slidably mounted in a sleeve 30 fixed in the intermediate housing 13. The lower jaw member is secured to the lower ends of a pair of sprocket chains 31 and 32 trained over sprocket wheels 33 and 34 rotatably mounted in the housing 12, the upper ends of said chains being affixed to the upper jaw member 27. The arrangement is such that as the plunger 29 is moved up and down, the jaw members 27 and 28 are moved simultaneously toward and away from each other to compress or release the flexible conduit 25 and thereby adjust the size of the conduit orifice and control the flow of fluid through said conduit.

The upper end of the plunger 29 extends into the intermediate housing 13 and is secured to the center of the sealing diaphragm 16, the latter being provided with reinforcing discs 35 on both sides thereof and dividing the interior of said housing 14 into upper and lower compartments 36 and 37. Said lower compartment communicates with the atmosphere through a venting plug 38 so that, as will later be understood, the diaphragm 16 is able to respond to changes in pressure on the upper surface thereof. The diaphragm 16 with its reinforcing discs 35, together with the plunger 29, constitute a motor means movement of which in one direction drives the conduit 25 toward its closed position and movement of which in the opposite direction permits said conduit to open.

The upper portion of the plunger 29 is recessed, as at 39, to receive another plunger 40, the latter being provided with an extension 41 secured at its upper end to a spring-retaining cup 42, the under surface of which engages the upper end of a compression spring 43, hereinafter sometimes referred to as the over-travel spring. The lower end of said spring 43 engages the upper surface of another spring-retaining cup 44 which is slidably mounted on the extension 41 of the plunger 40 and is maintained in contact at all times with the upper end of the plunger 29 by the force exerted by said spring.

The upper surface of the cup 42 abuts the lower end of another compression spring 45, hereinafter sometimes referred to as the range spring, the upper end of said spring engaging the lower surface of a spring-retaining disc 46.

The disc 46 is carried at the lower end of a rod 47 to which is also fixed reinforcing discs 48 engaging the upper and lower surfaces of the diaphragm 23, reinforcing discs 49 engaging the upper and lower surfaces of the diaphragm 22, and reinforcing discs 50 engaging the upper and lower surfaces of the diaphragm 24.

The diaphragm 23 and the diaphragm 22 provide a compartment 51 therebetween and the diaphragm 22 and the diaphragm 24 provide a compartment 52 therebetween. The diaphragm 24, in addition, seals off the upper housing 20 of the positioner 11 to provide another compartment 53 which communicates through a port 54 with the compartment 36 of the upper housing 14 of the valve 10. The compartment 52 communicates with the atmosphere through a vent 55, and through a passage 56 in the rod 47, said compartment also communicates with the compartment 53.

Bearing against the upper reinforced surface of the diaphragm 24 is the lower end of a compression spring 57, said spring having its upper end bearing against a spring-adjusting retainer 58 slidably mounted on a tube 59 carried in the housing 20. The upper end of the tube 59 is provided with a seat which is cooperable with a spring-pressed ball valve 60 to control communication between the interior of said tube 59 and a port 61 formed in the housing 20. The lower end of the tube 59 communicates with the compartment 53 of the housing 20 and extending from the ball valve 60 is a rod 62, the lower end of which cooperates with the port 56 to control communication between the compartments 52 and 53. The pressure exerted by the spring 57 is adjusted by a screw 63 threadedly engaged in the housing 20.

The positioner 11 is completed by a pair of gauges 64 and 65 mounted in the housing 20. The former communicates interiorly with the port 61 and exteriorly with a source of air pressure, designated in Fig. 1 of the drawings as "Air Supply." The latter communicates interiorly with a port 66 which leads to the compartment 51, and exteriorly with a source of air pressure signals, designated in Fig. 1 of the drawings as "Control Instrument Air," generated in a conventional manner, for example, in response to deviations of the capacity of the valve 10 from a preselected capacity.

This completes the description of the aforesaid illustrative embodiment of the present invention and its operation may be described as follows.

Figure 2:
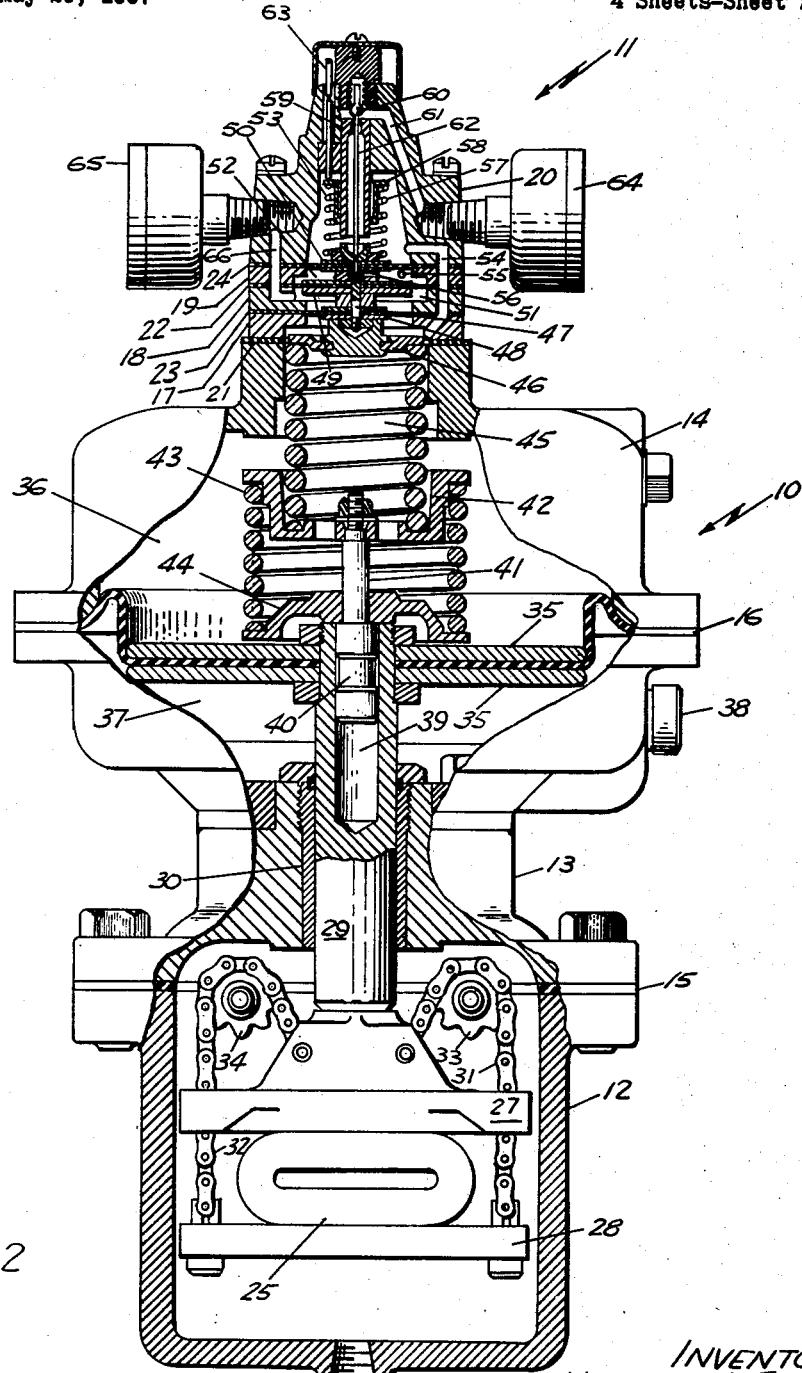
Fig. 2 is a similar view of the same, partially broken away to show in longitudinal section the coupling device of the present invention in its position when the valve is substantially at the lower end of its throttling range.
Figure 3:
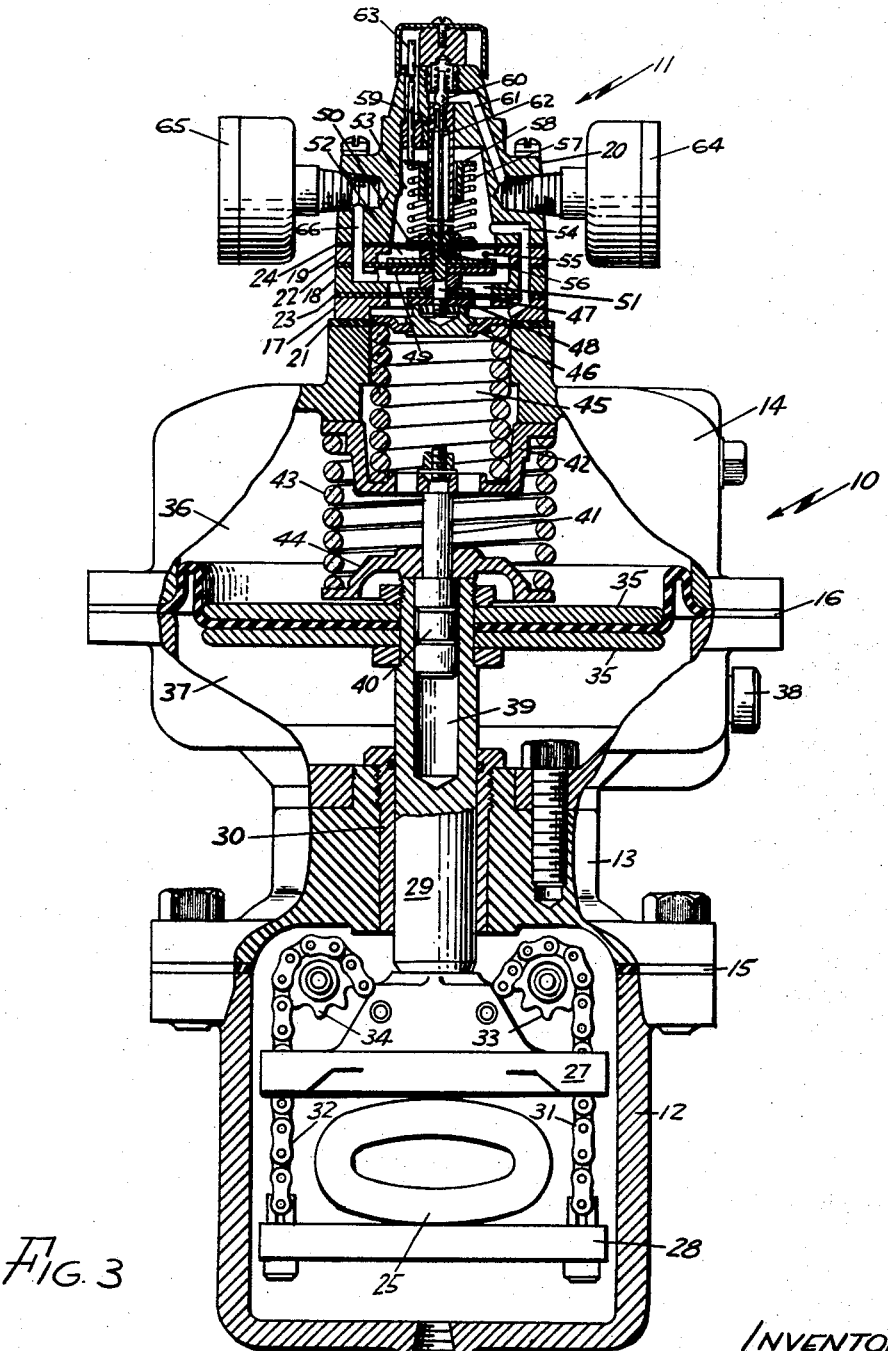
Fig. 3 is a view similar to Fig. 2 but showing the valve substantially at the upper end of its throttling range.

Assume that the position of the conduit 25 shown in Fig. 2 of the drawings corresponds to a condition equal to only 10% of the valve stroke, and passing 10% of the total valve capacity and that the position of this conduit shown in Fig. 3 of the drawings corresponds to a condition equal to only 40% of the valve stroke, but passing about 90% of the total valve capacity. Further assume that it is desired to throttle the valve, in other words, maintain fluid flow therethrough substantially constant, at some capacity within this 10% to 40% stroke range or 10% to 90% capacity range.

Air from the "Air Supply" shown in Fig. 1 is passed through the gauge 64, port 61, ball valve 60 and tube 59 to the chamber 53. From here it is passed through the port 54 to the chamber 36, where it acts against the upper surface of the diaphragm 16. The latter, being fixed to the plunger 29, moves said plunger downwardly to cause the jaw members 27 and 28 to compress the conduit 25 against the pressure of the fluid passing therethrough and thereby control the flow of said fluid.

The screw 63 is adjusted until at the selected capacity, the downward force exerted by the spring 57 is equal to the upward force exerted by the range spring 45 plus the upward force exerted in the chamber 51 against the undersurface of the diaphragm 22 by the air from the "Control Instrument Air" shown in Fig. 1, which enters the chamber 51 through the gauge 65 and port 66.

At this time, the ball valve 60 at the upper end of the rod 62 will be closed. Also, the port 56 will be closed by the lower end of the rod 62, and a condition of balance will exist.

The pre-load force of the spring 43, as stated in earlier portions of this specification, being greater than the maximum load force of the range spring 45, the spring 43 will serve merely as a rigid connection between the spring retainers 42 and 44 and only the range spring 45 will be effective to load the diaphragm 16.

Now assume that for some reason, the pressure exerted in the chamber 51 by the "Control Instrument Air" increases, thus disturbing the above referred to condition of balance. The diaphragm 22 being of greater area than the diaphragm 23, this increased pressure will act against the diaphragm 22 to lift the rod 47. This, in turn, will open the ball valve 60 to permit additional air from the "Air Supply" to pass through the gauge 64, port 61 and tube 59 to the chamber 53. This air will then pass through the port 54 to the chamber 36 where it will act against the upper surface of the diaphragm 16, tending to move said diaphragm downwardly. This movement is transmitted to the plunger 29 and the jaws 27 and 28 to move the latter toward each other to compress the conduit 25 and reduce the flow of fluid through said conduit.

Obviously, the downward movement of the diaphragm 16 relaxes the force exerted by the range spring 45 to compensate for the increased pressure in the chamber 51, thereby tending to restore the desired condition of balance. The interplay between these two pressures continues until at the time of complete restoration of the condition of balance, the flow of fluid through the conduit 25 is stabilized at the capacity originally selected.

Now assume that the pressure of the "Control Instrument Air" in the chamber 51 decreases. Again, the balance condition is disturbed, but this time, in the opposite direction. The spring 57, acting against the diaphragm 24, is now strong enough to move the rod 47 downwardly, opening the port 56 and permitting communication between the chambers 53 and 52. As a result, air from the chamber 36 passes through port 54 to the chamber 53 and thence through the port 56 to the chamber 52. From here the air passes to the atmosphere through the vent 55.

Because of the reduced pressure in the chamber 36, the pressure exerted by the fluid flow through the conduit 25 is able to somewhat open said conduit against the action of the range spring 45, thereby permitting increased fluid flow. This causes the spring 45 to tend toward compression, increasing the force it exerts against the diaphragm 23 and lifting the rod 47 to close the port 56. This action is in compensation for the reduced pressure in the chamber 51.

The interplay between the pressure in the chamber 51 and the pressure exerted by the spring 45 continues until their combined force equals the force of the spring 57 and once again, there is a condition of balance. At this time, the conduit 25 will have been returned to its preselected capacity condition.

Thus, by virtue of the present invention, the preselected condition of the valve is maintained through response to the externally-generated signals initiated by the "Control Instrument Air," the latter generating its signals in response to deviations from desired conditions in whatever processes are being fed by the pipe line in which the pinch valve conduit 25 is incorporated.

Now assume the occurrence of some event external to the valve which requires the valve stroke to exceed that represented by the 40% stroke shown in Fig. 3, for example, some stroke between that of Fig. 3 and that shown in Fig. 4.

Obviously, at the stage shown in Fig. 3, the diaphragm 16 has moved upwardly to a position wherein the range spring 45 has already been compressed to a maximum. In the absence of the present invention, further upward force against this spring would damage the valve positioner. However, it is to be noted that when this point is reached, the spring retainer 42 has come into contact with the upper wall of the housing 14. Therefore, the spring 45 cannot be further compressed nor can any further upward force against the retainer 42 be transmitted to said spring. Hence, the valve positioner is protected against damage.

But, the further opening of the conduit 25 continues to cause upward movement of the diaphragm 16. It will be recalled that the plunger 40 is fixed to the spring retainer 42, but that there is a sliding relationship between said plunger and the spring retainer 44 and between said plunger and the plunger 29. Hence, as the plunger 29 is carried upwardly by the diaphragm 16, it rides on the plunger 40, as does the spring retainer 44 which, always being in contact with the upper end of the plunger 29, is carried along with it. This is shown in Fig. 4.

When this action takes place, the movement of the spring retainer 44 is absorbed by the over-travel spring 43 which, abutting the retainers 42 and 44, is itself providing the sole loading on the diaphragm 16. Obviously, after conditions are restored to correspond to a valve position between those shown in Figs. 2 and 3, the over-travel spring 43 discontinues its loading of the diaphragm 16 and the range spring 45 again takes over.

This completes the description of the mode of operation of the present invention.

It will be noted from all of the foregoing that there has been provided a coupling for use between the diaphragm assembly of a valve positioner and the orifice-controlling mechanism of a valve which protects the valve positioner from damage in those cases where the stroke of the positioner is less than the possible stroke of the valve. It will also be noted that the coupling provided by the present invention permits throttling of the valve in accordance with settings of the valve positioner at any preselected setting within a preselected range of valve capacities corresponding to a desired throttling range.

Other objects and advantages of the present invention will readily occur to those skilled in the art to which the same relates.

What is claimed is:

1. In combination: a housing containing a pinch valve and a valve positioner; a first plunger slidably mounted in said housing and coupled to said pinch valve to control the flow of fluid therethrough; a second plunger slidably mounted in said first plunger; a first spring-retaining member engaging said first plunger and slidably mounted on said second plunger; a second spring-retaining member spaced from said first plunger and fixed to said second plunger; a first compression spring having its ends coupled, respectively, to said valve positioner and said second spring-retaining member; a second compression spring having its ends coupled, respectively, to said first and second spring-retaining members; said second spring exerting a pre-load force in excess of the maximum load force exerted by said first spring; and a stop projection in the path of said second spring-retaining member to limit the movement of said second spring-retaining member and said second plunger toward said valve positioner, whereby subsequent movement of said first plunger toward said valve positioner produces relative motion between said first and second plungers.

2. In combination with the orifice-controlling mechanism of a valve and the diaphragm assembly of a valve positioner, means interconnecting said orifice-controlling mechanism and said diaphragm assembly comprising: a first loading means coupled to said diaphragm assembly; a motor means; a second loading means coupled to said orifice-controlling mechanism; said first and second loading means being connected in series at valve capacities within a preselected capacity range; said second loading means exerting a pre-load force in excess of the maximum load force exerted by said first loading means whereby during operation within said preselected capacity range, said second loading means rigidly connects said first loading means through said motor means with said orifice-controlling mechanism and only said first loading means effectively loads said orifice-controlling mechanism; means, operative at valve capacities outside of said preselected capacity range, to discontinue the functioning of said first loading means whereby said diaphragm assembly and said orifice-controlling mechanism are disconnected; and means operative at said last-named valve capacities to effect loading of said orifice-controlling mechanism only by said second loading means.

3. In combination with the orifice-controlling mechanism of a valve and the diaphragm assembly of a valve positioner, means interconnecting said orifice-controlling mechanism and said diaphragm assembly comprising: a first compression spring having one of its ends coupled to said diaphragm assembly; a motor means; a second compression spring having one of its ends coupled through said motor means to said orifice-controlling mechanism; means, engaging the remaining ends of said first and second springs, for connecting said springs in series at valve capacities within a preselected capacity range; said second spring exerting a pre-load force in excess of the maximum load force exerted by said first spring whereby during operation within said preselected capacity range, said second spring rigidly connects said first spring with said orifice-controlling mechanism and only said first spring effectively loads said orifice-controlling mechanism; means, operative at valve capacities outside of said preselected capacity range, to discontinue the functioning of said first spring whereby said diaphragm assembly and said orifice-controlling mechanism are disconnected; and means operative at said last-named valve capacities to effect loading of said orifice-controlling mechanism only by said second spring.

4. In combination with the orifice-controlling mechanism and the diaphragm assembly of a valve and valve positioner: a motor means; first and second loading means interconnecting said orifice-controlling mechanism and said diaphragm assembly through said motor means; said first and second loading means being connected in series at valve capacities within a preselected capacity range; said second loading means exerting a pre-load force in excess of the maximum load force exerted by said first loading means whereby during operation within said preselected capacity range, said second loading means rigidly connects said first loading means with said orifice-controlling mechanism and only said first loading means effectively loads said orifice-controlling mechanism; means, operative at valve capacities outside of said preselected capacity range, to discontinue the functioning of said first loading means whereby said diaphragm assembly and said orifice-controlling mechanism are disconnected; and means operative at said last-named valve capacities to effect loading of said orifice-controlling mechanism only by said second loading means.

5. In combination with the orifice-controlling mechanism and the diaphragm assembly of a valve and valve positioner: a motor means; first and second springs interconnecting said orifice controlling mechanism and said diaphragm assembly through said motor means; said first and second springs being connected in series at valve capacities within a preselected capacity range; said second spring exerting a pre-load force in excess of the maximum load force exerted by said first spring whereby during operation within said preselected capacity range, said second spring rigidly connects said first spring with said orifice-controlling mechanism and only said first spring effectively loads said orifice-controlling mechanism; means, operative at valve capacities outside of said preselected capacity range, to discontinue the functioning of said first spring whereby said diaphragm assembly and said orifice-controlling mechanisms are disconnected; and means operative at said last-named valve capacities to effect loading of said orifice-controlling mechanism only by said second spring.

6. In combination with the orifice-controlling mechanism of a valve and the diaphragm assembly of a valve positioner, means interconnecting said orifice-controlling mechanism and said diaphragm assembly comprising: a first loading means coupled to said diaphragm assembly; a motor means; a second loading means coupled through said motor means to said orifice-controlling mechanism; means, intermediate said first and second loading means, for connecting the same in series at valve capacities within a preselected capacity range; said second loading means exerting a pre-load force in excess of the maximum load force exerted by said first loading means whereby during operation within said preselected capacity range, said second loading means rigidly connects said first loading means with said orifice-controlling mechanism and only said first loading means effectively loads said orifice-controlling mechanism; means, engaging said series-connecting means at valve capacities outside of said preselected capacity range, to discontinue the functioning of said first loading means whereby said diaphragm assembly and said orifice-controlling mechanism are disconnected; and means engaging said series-connecting means, and slidable with respect to said orifice-controlling mechanism and the coupling between said second loading means and said orifice-controlling mechanism at said last-named valve capacities to effect loading of said orifice-controlling mechanism only by said second loading means.

7. In combination with the orifice-controlling mechanism of a valve and the diaphragm assembly of a valve positioner, means interconnecting said orifice-controlling mechanism and said diaphragm assembly comprising: a first compression spring having one of its ends coupled to said diaphragm assembly; a motor means; a second compression spring having one of its ends coupled through said motor means to said orifice-controlling mechanism; means, engaging the remaining ends of said first and second springs, for connecting said springs in series at valve capacities within a preselected capacity range; said second spring exerting a pre-load force in excess of the maximum load force exerted by said first spring whereby during operation within said preselected capacity range, said second spring rigidly connects said first spring with said orifice-controlling mechanism and only said first spring effectively loads said orifice-controlling mechanism; means, engaging said series-connecting means at valve capacities outside of said preselected capacity range, to discontinue the functioning of said first spring whereby said diaphragm assembly and said orifice-controlling mechanism are disconnected; and means engaging said series-connecting means, and slidable with respect to said orifice-controlling mechanism and the coupling between said second spring and said orifice-controlling mechanism at said last-named valve capacities to effect loading of said orifice-controlling mechanism only by said second spring.

No references cited.